United States Patent
Baranyi et al.

[15] 3,660,034
[45] Feb. 2, 1972

[54] INSTRUMENTAL METHOD AND EQUIPMENT FOR THE DETERMINATION OF THE DEGREE OF MATURITY IN FRUIT, PARTICULARLY IN POMACEOUS FRUIT

[72] Inventors: Jozsef Baranyi, Mezotur; Luszlo Lakatos, Torokszentmiklos, both of Hungary

[73] Assignee: Licencia Talalmanyokat Ertekesito Vallalat, Budapest, Hungary

[22] Filed: Dec. 2, 1969

[21] Appl. No.: 881,441

[30] Foreign Application Priority Data

Dec. 2, 1968   Hungary..............................BA2137

[52] U.S. Cl..........................23/230 R, 23/232 E, 23/253 R, 23/254 E, 73/19, 99/103, 324/30 R
[51] Int. Cl..............G01m 27/00, G01n 31/06, G01n 33/02
[58] Field of Search................23/230, 232, 232 E, 253, 254, 23/254 E, 255 E, 292; 55/68; 73/19; 324/30 B, 30

[56] References Cited

UNITED STATES PATENTS

| | | | |
|---|---|---|---|
| 1,475,000 | 11/1923 | Cooper et al. | 23/255 E |
| 2,046,583 | 7/1936 | Rummel | 23/230 |
| 2,063,245 | 12/1936 | Haeseler | 23/232 X |
| 2,230,593 | 2/1941 | Hassler | 23/254 E |
| 2,786,977 | 3/1957 | Blagg et al. | 324/30 |
| 2,943,984 | 7/1960 | Gullett | 324/30 UX |
| 3,420,635 | 1/1969 | Davis | 23/253 TP |

*Primary Examiner*—Joseph Scovronek
*Attorney*—Arthur O. Klein

[57] ABSTRACT

A process and apparatus for determining the degree of maturity in fruit by determining the amount of carbon dioxide developed by the fruit. The carbon dioxide formed by the fruit is absorbed in a suitable alkaline solution and the amount of developed carbon dioxide is determined by measuring the electrical conductivity of the solution.

7 Claims, 1 Drawing Figure

PATENTED MAY 2 1972  3,660,034
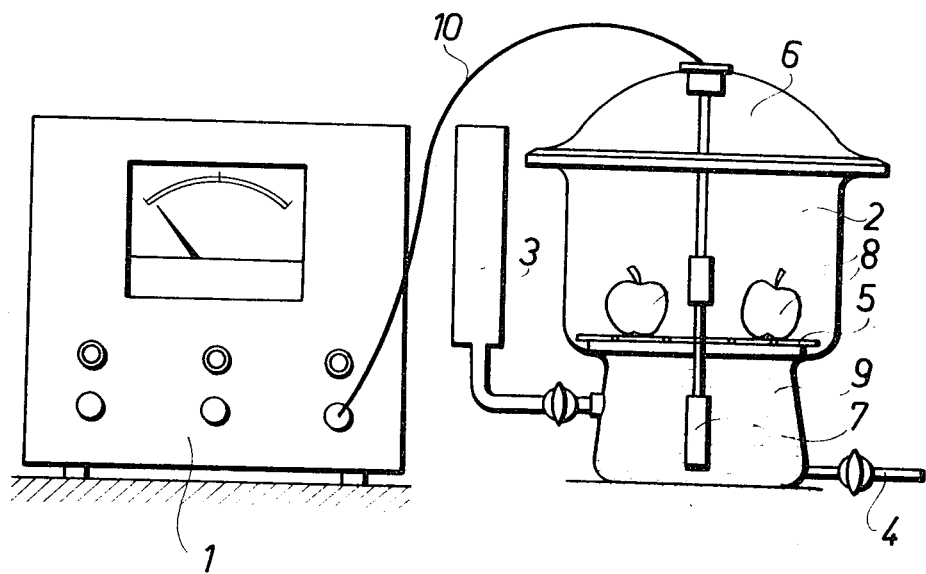
INVENTORS:
JOZSEF BARANYI AND
LASZLO LAKATOS
BY: Arthur O. Kle
ATTORNEY

3,660,034

INSTRUMENTAL METHOD AND EQUIPMENT FOR THE DETERMINATION OF THE DEGREE OF MATURITY IN FRUIT, PARTICULARLY IN POMACEOUS FRUIT

The subject of the invention is an instrumental method and equipment for the establishment of the degree of maturity in fruit, particularly in pomaceous fruit.

The maturity of apples and pears, that is of pomaceous fruit is generally established by subjective methods on the basis of the sensory evaluation of their color, taste, texture and flesh-consistency, or even the condition of the seed within. Sometimes conclusions are drawn from the number of days that elapsed since florescence, or at research and experimental stations, provided with suitable laboratories, it was assayed to draw conclusions from the observation of carbohydrate degradation or from the recording of the amount of oxygen used.

The importance of establishing the degree of maturity lies in the circumstance that in order to obtain the fruit in a condition optimal for a given purpose it has to be harvested at various stages of maturation. The degree of maturity is very important further from the point of view of storage. First of all it has to be established what kind of fruit is at all suitable for storage, and on the other hand, the degree of maturity is of decisive importance as regards utilization and suitability for marketing.

It is well known, that for the purpose of canning fruit has to be harvested prior to complete maturity and similarly an earlier harvesting is desirable if the fruit is to be transported or stored for some time prior to use. The fruit harvested at the stage of complete maturity has to be used or eaten within a comparatively short period, because its value may substantially be reduced or its market value totally destroyed by over-ripening, becoming apparent in various forms (softening, loss of flavor, the evaporation of volatile aroma substances, or even organic degradation).

However, harvesting too early is just as unfavorable as too late, because in this case there is no time for the aroma and flavor to develop as desirable. It is of disadvantage also that due to too early harvesting a substantial loss of quantity occurs, since the majority of the apple type fruits is gaining up to the moment of harvest.

Thus it is very important to be able to determine with a high degree of certainty the degree of maturity in fruit. Experiments were made into the determination of the degree of ripeness by the firmness of the fruit (for instance in apricots and peaches). A penetrometer was used for this purpose. The force needed to press a metal stopper of known diameter into the fruit is recorded in this case. However experience has shown that this method is far from reliable. Individual fruit samples from the same tree may greatly differ as regards firmness and the result depends on a number of parameters, every one of which affects the reliability of the result, such as temperature, moisture content, etc.

As seen from the literature, it was suggested to determine the degree of maturity in pomaceous fruit by its starch content. Thin slices were cut from the fruit and immersed into iodine containing solution. It was suggested to consider the fruit "unripe" when the whole slice became dark, "halfripe" when dark spots were formed and a dark layer just below the skin. If no darkening was observable, or the slice became light-blue, the fruit was to be considered "mature". Since, however, the starch content and the changes occurring in the fruit are highly irregular and depend on a number of parameters, this method was not satisfactory either.

In other experiments samples of the fruit were picked and were placed in a climatic chamber, and a gaseous substance of maturing capacity was introduced. As an effect of the gas the samples were ripened. From the time needed for ripening conclusions were drawn as to the degree of maturity of the fruit on the tree. However this method was not satisfactory either.

On theoretical principles it was tried to place the fruit in the presence of barium hydroxide, milk of lime or potassium hydrate and to control the concentration of these substances by repeated titration. The change of concentration is recorded and allows of drawing conclusions as to the ripeness of the fruit. However the procedure is highly intricate and expensive and the repeated titration requiring specific training and equipment is not only time and work consuming but includes also a number of sources of error and thus the reliability of the method is highly questionable.

The condition and maturity of the fruit at harvest is particularly important if the fruit is to be stored for a long period. The world-wide increase of fruit production infers up-to-date storage. The investment of storage facilities is recovered and ensures the greatest possible profit and expediency if the fruit stored is of the degree of maturity that is the most suitable for storage.

Since, however, no objective method was suggested so far for the establishment of maturity, it was the object of this invention to eliminate the defects and inadequacy of the processes hitherto used creating thereby a simple, cheap, reliable and rapid method for the objective determination of the degree of maturity in various fruits, particularly in pomaceous fruit.

The invention is based on the idea, with special reference to the fruit to be stored, that the fruit kept in cold storage is not mature, only "storage ripe". It has also to be kept in mind that in large storehouses the individual fruit batches collected from various growing places are of various degrees of maturity and of varied quality and the steadily advancing process of ripening during storage has to be continuously controlled by the continuous recording of the data.

In accordance with the object of the invention, the process aimed at the determination of maturity of fruits, particularly of pomaceous fruit, is carried out by way of measuring the amount of carbon dioxide developed by the fruit, by means of absorbing the carbon dioxide formed by the fruit in an absorbent solution and subsequently determining the quantity of the absorbed carbon dioxide.

A further characteristic of the process according to the invention is that the amount of the absorbed carbon dioxide is determined by means of recording the change of electric conductivity of the solution. The fruit is placed in a closed measuring chamber, in the presence of the absorbent solution. The electric conductivity of the absorbent solution is measured at the time of placing the fruit in the measuring chamber and after a predetermined period. The amount of carbon dioxide developed during this period is determined from the change of conductivity and from data thus obtained the suitablility of the fruit for harvesting, storage, transport of consumption respectively, is determined.

In order to obtain true results the measuring instruments have to be placed under conditions corresponding to the natural or storage conditions of the fruit. The absorbent is a solution of known normality and conductivity, preferably an alkali hydroxide, for instance sodium hydroxide or potassium hydroxide.

The equipment to be used in the process in accordance with the invention comprises a testing unit holding the fruit and the solution and another unit containing an instrument for the recording of the amount of carbon dioxide developed by the fruit.

In the expedient version of the instrument according to the invention the fruit is placed on a perforated desiccator plate, possibly above the absorbent solution, and an electrode is immersed in the solution, which is introduced through the measuring chamber of the testing unit, expediently through the lid of the chamber, and it is connected to recording unit. The latter is known as a conductometer.

In order to be able to introduce the absorbent solution into the measuring chamber and to drain it off under the exclusion of air during the introduction as well as the draining off of the absorbent solution, the measuring chamber is provided with a funnel with stopcock and a draining cock.

The process according to the invention for the determination of the degree of maturity in fruits, particularly pomaceous fruit has many advantages over the processes hitherto known and difficult to carry out in practice. The most important of these advantages is that the process may be applied equally well by the grower, the operator of a store house, or even the marketing establishment, there is no need of laboratory equipment, specific reagents or trained staff with the knowledge of chemistry or physics. The process is virtually devoid of error and extremely rapid. According to experience not more than 5 minutes are needed to establish the degree of maturity of the chosen sample. It is true that the purchase of the instrument involves some investment, however these expenses are negligible in comparison to the acquirable gain, or to the loss prevented by the use of the method.

The invention is now explained by way of an example and on the basis of the enclosed drawing. The enclosed schematic diagram shows the instrument according to the invention.

The conductometer 1 serving to measure the electrical conductivity is connected to measuring chamber 2 with cable 10. Measuring chamber 2 is provided with funnel 3 with stopcock, which serves for the introduction of absorbent solution 9 into measuring chamber 2. This is necessary to exclude air from fruit 8 placed on the desiccator plate 5, that is to eliminate the need of removing lid 6 of measuring chamber 2 for the introduction of absorbent solution 9. In order to be able to drain off absorbent solution 9 from measuring chamber 2 without the necessity of opening it, measuring chamber 2 is provided further with draining cock 4. The measuring electrode 7 is introduced through lid 6 and senses the carbon dioxide developed by the fruit.

The measurement is carried out by placing a fruit sample 8 to be tested into the apparatus having the same temperature as the environment of the fruit. After the placement of the fruit the conductometer is switched on by connecting cable 10 leading from measuring electrode 7 to conductometer 1. Then the conductivity of absorbent introduced through funnel 3 with stopcock into measuring chamber 2, is established.

The fruit is left in measuring chamber 2 and the measurement is repeated after 24 hours. Experience shows that the second value is lower than the first one, which proves that the conductivity of absorbent solution 9 is reduced proportionately to the amount of carbon dioxide absorbed. It is easy to prepare a scale or diagram based on experimental results, which may be used for the direct reading of the amount of absorbed carbon dioxide from the change of conductivity in millisiemens. Since the carbon dioxide is developed by fruit sample 8, the two measurements carried out at 24 hours time interval show the quantity of carbon dioxide emitted by the fruit during 24 hours. As dictated by experience, the weight of the fruit sample placed into the measuring chamber should also be established. The results obtained for each sample, for the sake of better comparability, should be related to unit weight, for instance of 1.0 kilo fruit.

The amount of carbon dioxide developed by an unit quantity of fruit (1.0 kilo) during unit time (24 hours) may be plotted in a curve, the abscissa axis showing the reading times, and the axis of ordinates the specific quantities of carbon dioxide, in gram. From the results obtained in relation to a given fruit variety the stages of maturity "suitable for storage", "suitable for transport" and "suitable for consumption", respectively, may empirically be established. In accordance with the experiences hitherto gained, it is possible to extrapolate from the data obtained the length of period during which under given conditions the given fruit may be suitable for storage, transport or consumption.

According to experience it is desirable to place three or four pieces of fruit simultaneously in measuring chamber 2. It is of advantage to use several measuring chambers 2 simultaneously because the degree of maturity of each fruit within the crop of one tree is different dependent on their location on the tree, that is, whether they are located on the top branch or a lower branch, on the side of the tree exposed to sunshine or on the other side. Conductometer 1 can be connected simultaneously to several measuring chambers 2 and in this case a series of readings may be accomplished at one time by connecting the appropriate measuring chamber 2 to conductometer 1.

The method thus developed proved satisfactory and reliable in relation to pomaceous fruit, however, it was not found suitable for the determination of the degree of maturity in berry-fruits and stone-fruits. The apparatus in accordance with the invention may be used beside the determination of the degree of maturity, for other plant biological observations. As it is generally known, plants not only emit, but at the same time absorb carbon dioxide. In the case of these other biological functions it is not inevitably necessary to use an alkali hydroxide as absorbent, but the solution of some other suitable reagent may be used.

Although our invention has been illustrated and described with reference to the preferred embodiments thereof, we wish to have it understood that it is in no way limited to the details of such embodiments but is capable of numerous modifications within the scope of the appended claims.

We claim:

1. A method for the determination of the degree of maturity of specimens of fruit which develops carbon dioxide as it matures, comprising performing a succession of tests on the same specimens, each such test comprising absorbing the carbon dioxide formed by the fruit in carbon dioxide absorbent solution for a predetermined period, and determining the quantity of the thus-absorbed carbon dioxide in each test by detecting the change in electrical conductivity of the solution from the beginning to the end of each test.

2. The method according to claim 1, wherein each test comprises placing the fruit in a closed measuring chamber in the presence of the absorbent solution.

3. The method according to claim 2, wherein the fruit being tested is taken from a number of similar fruit maturing under predetermined temperature conditions, and comprising holding the fruit being tested under the same predetermined temperature conditions.

4. The method according to claim 1, wherein the absorbent solution is an alkali hydroxide solution having normality and conductivity predetermined for each of the tests in the determination of the degree of maturity of the fruit.

5. A method according to claim 1, comprising preparing a diagram based on the experimental results of said tests, one of the coordinates of said diagram reading in time and the other coordinate of the diagram reading in the specific quantity of carbon dioxide absorbed by the absorbent solution.

6. Apparatus for determining the degree of maturity of fruit which develops carbon dioxide as it matures, comprising a closed measuring chamber containing an absorbent solution for carbon dioxide in one part thereof and the fruit being tested in another part thereof, an electrode immersed in the solution, an electrical unit connected to the electrode for detecting the electrical conductivity of the solution, a funnel disposed above the solution, a conduit having a first stop cock therein connecting the bottom of the funnel to said other part of the chamber, and a discharge conduit having a second stop cock therein connected to said other part of the chamber, whereby the absorbent solution can be introduced into and withdrawn from the measuring chamber without exposing the absorbent solution in the chamber to air.

7. Apparatus for determining the degree of maturity of fruit which develops carbon dioxide as it matures, comprising a closed measuring chamber containing a solution which absorbs carbon dioxide in one part thereof and the fruit being tested in another part thereof, an electrode immersed in the solution, and an electrical unit connected to the electrode for detecting the electrical conductivity of the solution, the solution being contained in the bottom of the measuring chamber, a support plate arranged in said chamber above the solution for the fruit being tested, and an electrode depending from above into the solution.

* * * * *